Oct. 26, 1943.  D. K. POPE  2,333,040
APPARATUS FOR TESTING BEARINGS
Filed July 13, 1940  2 Sheets-Sheet 1
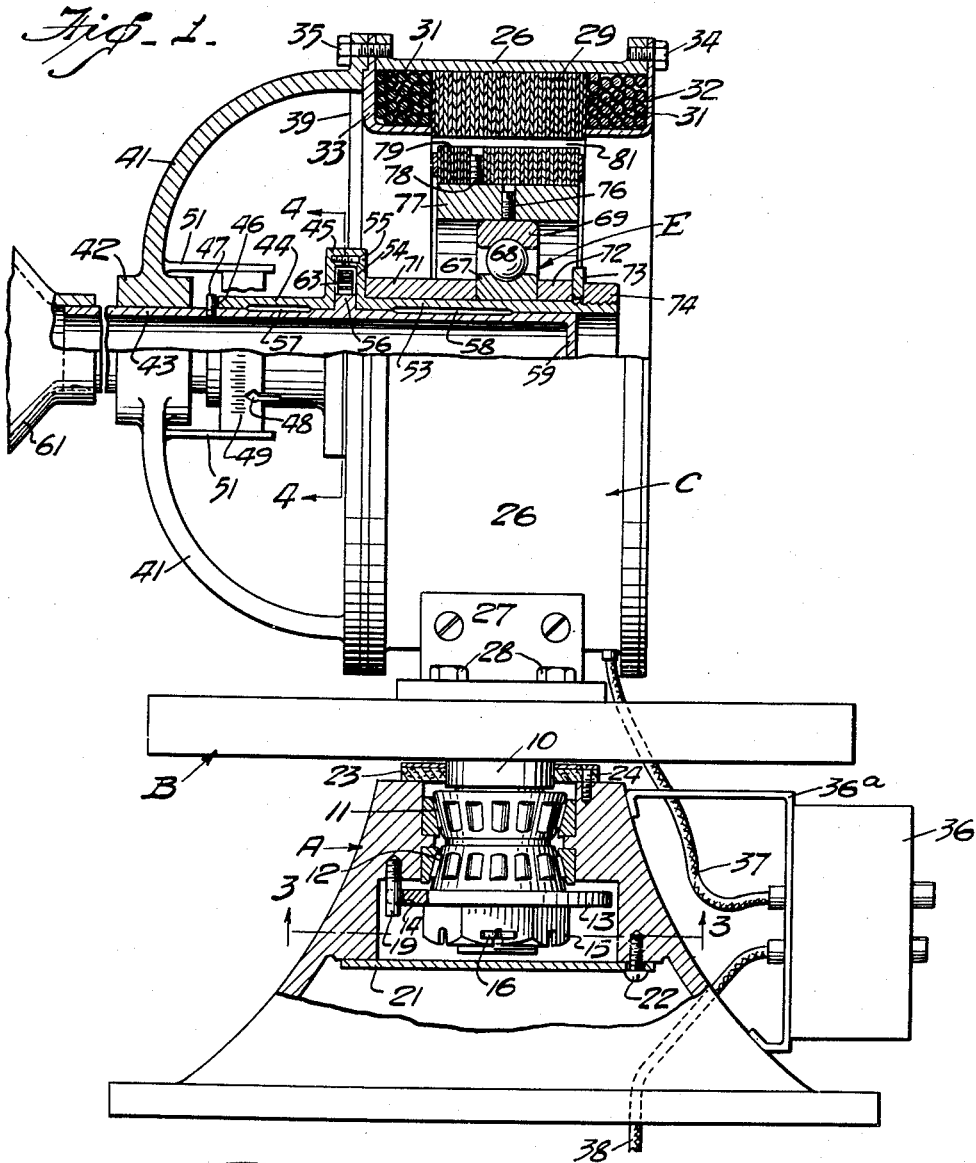
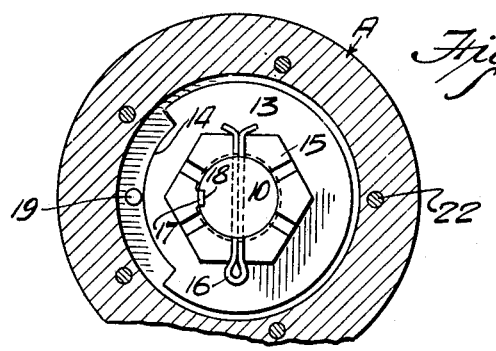
Inventor
DEMETRIOS K. POPE
By Norris & Bateman
Attorneys Oct. 26, 1943.   D. K. POPE   2,333,040
APPARATUS FOR TESTING BEARINGS
Filed July 13, 1940   2 Sheets-Sheet 2
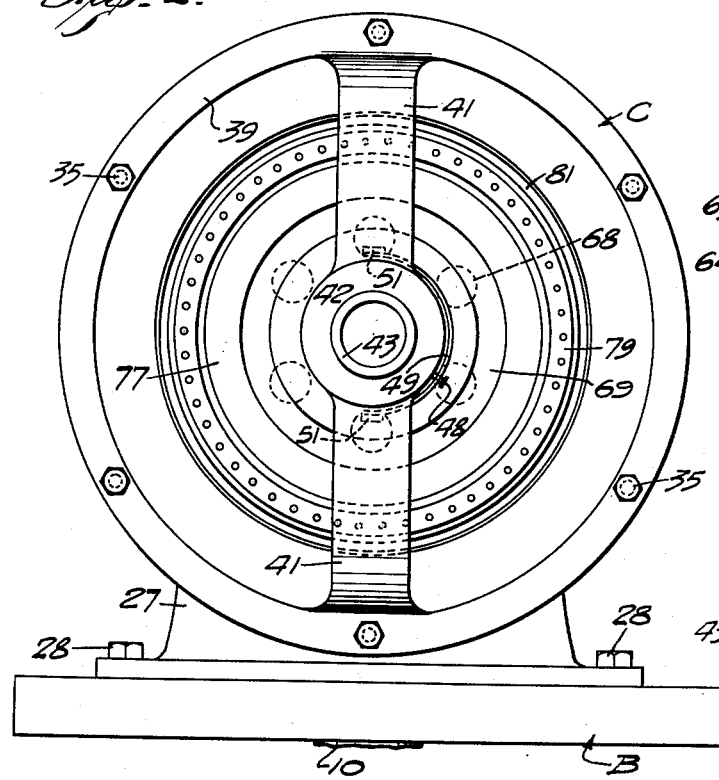
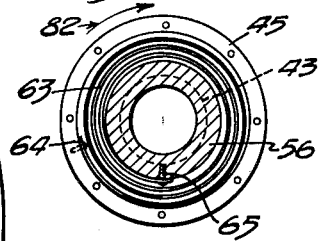
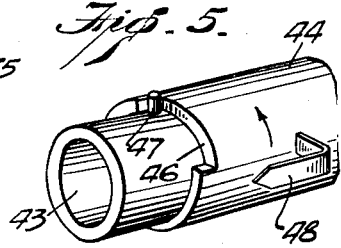
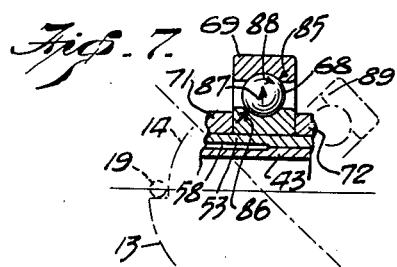
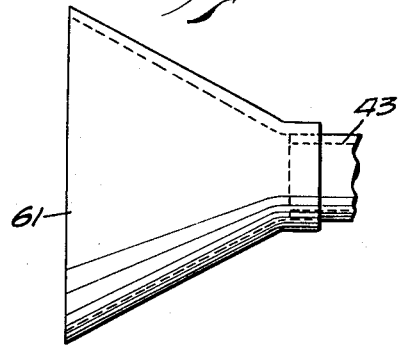
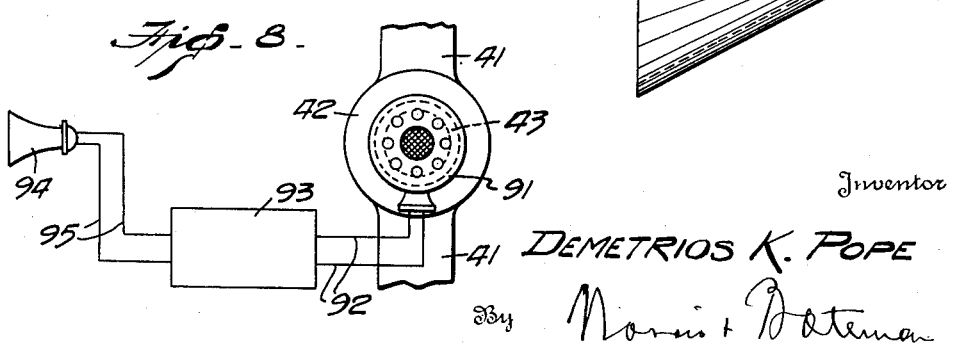
Inventor
DEMETRIOS K. POPE
By Norris + Bateman
Attorneys Patented Oct. 26, 1943

2,333,040

UNITED STATES PATENT OFFICE 2,333,040

APPARATUS FOR TESTING BEARINGS

Demetrios K. Pope, Gary, Ind.

Application July 13, 1940, Serial No. 345,401

16 Claims. (Cl. 73—51)

The present invention relates to an apparatus for testing bearings, more particularly anti-friction bearings, and is designed to give them a test run before they are placed in service, to check them for noises and indicate their performance in general, so as to eliminate disassembling machinery to remove a defective bearing.

Although apparatus of this general type have been heretofore proposed, they are open to the objection that they are only capable of giving a very approximate indication of the bearing performance, with the result that after a bearing is tested and installed in a machine, it must be removed, due to a defect which the test apparatus failed to reveal. The prior test apparatus are particularly deficient in testing ball bearings since they are not designed to insure contact of all of the surfaces of the balls with all of the surfaces of their races, during the test, nor do they cause the balls to roll on the cheeks of the inner and outer races, to discover defects therein.

It is accordingly the major object of this invention to provide a novel apparatus for testing anti-friction bearings, which will efficiently detect any imperfections which are present therein, either as the result of errors in the original manufacture, or an improper reconditioning operation.

A further important object is to provide a bearing testing apparatus which will accurately indicate the condition of the bearing without subjecting it to stresses comparable to those to which it is subjected in service, and whereby it may be of a light, portable character.

A further object is to provide a bearing testing apparatus embodying means for rotating one race with respect to the other without imparting mechanical forces to it, so that any vibrations or noise developed in the bearing may be observed without interference from extraneous noises and vibrations.

It is another object to provide a machine having means for supporting one race of the bearing and means for rotating the other race and simultaneously causing skewing forces to be developed in the other race, the latter race being mechanically free from all parts of the machine, so that any vibrations transmitted to said one race will result solely from operation of the bearing.

Another object of the invention is to devise a bearing testing machine having novel means for directly indicating the resistance in the bearing to relative rotation between the outer and inner races as the result of imperfections in the bearing.

Further objects will become apparent as the specification proceeds in conjunction with the drawings, and from the appended claims.

In the drawings:

Fig. 1 is a vertical elevational view, with parts broken away and in section, of the bearing testing apparatus of the invention;

Fig. 2 is an end view of the apparatus shown in Fig. 1 as it appears when viewed from the left-hand side of that figure;

Fig. 3 is a sectional view taken on the line 3—3 of Fig. 1, looking in the direction of the arrows;

Fig. 4 is a sectional view taken on the line 4—4 of Fig. 1, looking in the direction of the arrows;

Fig. 5 is a perspective view illustrating the motion limiting connection between the bearing support and the sleeve;

Fig. 6 is a side elevational view of the sound amplifier shown in Fig. 1;

Fig. 7 is a fragmental sectional view illustrating certain force conditions in the bearing as it is undergoing test; and Fig. 8 is a diagrammatic illustration showing a modified form of sound amplifying device associated with the apparatus of Fig. 1.

With continued reference to the drawings, wherein like reference characters have been employed to designate like parts throughout the several views thereof, the apparatus comprises in general a base A, upon which a table B, carrying a motor structure C, is mounted for rotation about a vertical axis. The bearing E to be tested is mounted within the motor structure in a manner to be hereinafter pointed out.

Table B is rigidly secured to a shaft 10, and the latter is journalled in base A by means of a pair of tapered roller bearings 11 and 12. A disc 13, having an arcuate recess 14 in its periphery, is fitted over shaft 10 and secured in place by means of a nut 15 and a cotter pin 16. A key 17 formed on disc 13 fits in a keyway 18 in shaft 10 to lock the parts against relative rotation. A stop pin 19 screwed into the base cooperates with recess 14 in disc 13 to preferably limit shaft 10 to approximately 90° of rocking movement.

By adjusting nut 15 bearings 11 and 12 may be adjusted in well known manner, and they are preferably adjusted to rigidly support shaft 10 but have sufficient play to permit the table to turn freely. A closure plate 21 is secured to the underside of the base by screws 22 to provide a lubricant reservoir. A seal assembly 23 is fitted over the upper end of shaft 10 and is secured to the upper side of the base by screws 24 and serves to prevent extraneous matter from finding its way into the bearings.

The table structure accordingly is mounted for free rocking movement about a vertical axis and is rocked, preferably manually, during the test operation, to cause a gyroscopically induced skewing force to develop in the outer race of the bearing undergoing test, for a purpose that will presently appear.

The motor structure comprises a flanged cylindrical member 26 rigidly secured to a bracket 27, which in turn is secured to table B by screws 28. A stator assembly is mounted and secured within member 26, and comprises a laminated stator core 29 and windings 31. Windings 31 are enclosed by flanged rings 32 and 33, held in place by screws 34 and 35 respectively for protection against damage. Winding 31 is connected to a switch 36 by a lead 37, and a second lead 38 is connected to a source of power, preferably three phase alternating current. Switch 36 may be supported in any suitable manner, as for instance by a bracket 36ª on base A.

Also secured to shell 26 by screws 35 is a supporting structure 39 having curved arms 41 carrying an enlarged boss 42 adjacent the axis of the motor structure. A tube or sound tube 43 is rigidly secured to arms 41, preferably by pressing into boss 42 and it supports the bearing to be tested, in the following manner.

Mounted for limited rocking movement on tube 43 is a sleeve 44 having a flange 45. As seen in Fig. 5, sleeve 44 is provided with an axially directed recess 46 which cooperates with a stop pin 47 secured to support 43 to limit rocking movement of sleeve 44 to approximately 90°. Sleeve 44 is also provided with a pointer 48, which cooperates with a scale 49 carried by a pair of arms secured to arms 51. Pointer 48 indicates the degree of friction in the bearing and may be graduated in pounds, ounces or angles of deflection, as may be desired.

A second sleeve 53, is mounted for rocking movement on support or sound tube 43 and has a flange 54 secured to flange 45 of sleeve 44 by screws 55. Flanges 45 and 54 define a closed housing and abut opposite sides of a shoulder 56 on support 43 to prevent axial movement of the sleeve assembly, and the sleeves and tube 43 are relieved at 57 and 58 to reduce frictional resistance to rocking movement.

Tube 43 is also provided with a closed end 59, so that all sounds developed therein during testing of the bearing will be transmitted to the open end, and the latter is provided with a sound amplifying device such as a horn 61 for the purpose of amplifying the sounds transmitted to the open end of the tube.

A spiral spring 63 is located in the chamber between the sleeve flanges and is secured to the sleeve assembly and the sound tube boss 56 at 64 and 65 respectively and constantly urges the sleeve assembly in a counter-clockwise direction (Fig. 4) with respect to tube 43, so as to constantly maintain one end of recess 46 in engagement with stop pin 47 as shown in Fig. 5 when no stresses are placed on the sleeve assembly.

The bearing to be tested, here shown as a combined radial and axial load sustaining ball bearing E, having an inner race 67, balls 68 and an outer race 69, may be rigidly supported on the sleeve assembly in any suitable manner, but I preferably support the inner race directly upon sleeve 53, and back it up at each side with spacer members 71 and 72, and lock it against axial movement and clamp it between the spacers by a washer 73 and a nut 74 threaded on the end of sleeve 53. It is to be understood that spacers 71 and 72 are made in various sizes to suit different bearings, and if it is desired to accommodate the machine to handle different diametered bearings, various sizes of collars may be interposed between the inner race and sleeve 53.

My apparatus also embodies novel means for rotating the outer race of the bearing without the application of mechanical forces to it. Secured to the outer race by one or more set screws 76 is a ring 77, and secured to it in turn by one or more set screws 78 is a rotor 79. In both instances the set screws are so arranged as to not disturb the balance of the structure.

As seen in Fig. 1, an air gap 81 of rather large size exists between stator 29 and rotor 79. The windings 31 are accordingly so wound as to properly energize the rotor with the increased air gap, by setting up a rotating magnetic field around the rotor, as in a standard induction motor.

The motor may be designed to operate in any of the following ways:

(1) The stator may be wound for single phase operation.

(2) The stator may be wound for three phase operation and rotor 79 eliminated altogether by increasing filler collar 77 sufficiently to provide the desired air gap 81.

(3) The stator may be wound three phase, and the outer race of the bearing itself permitted to constitute the rotor by providing the desired air gap.

In any event it is observed that rotation of the outer race may be effected without contact with any other part except balls 68, so that any noises or vibrations which are detected when the bearing is tested may be attributed directly to it and not to any other parts, because the outer race and the balls of the bearing are the only moving parts, aside from filler collar 77 and rotor 79 when they are used, but the latter are mechanically in effect a part of the outer race, because they rotate synchronously with it, and the appended claims are intended to embrace the novel motor structure irrespective of whether the filler collar and/or rotor are used.

The testing operation is preferably carried out in three stages as follows:

(1) After the bearing is rigidly mounted on sleeve 53, with the proper spacers 71 and 72, and the appropriate sized filler collar 77 and rotor (if the latter are used), nut 74 is slightly tightened. The current is then turned on by closing switch 36 to rotate the outer race at a suitable speed.

Now, if any knocks are heard and pointer 48 shows a deflection, it is a sign that the bearing has not been well cleaned. Dirt or other extraneous matter wedging between the balls and the races causes the inner race to tend to follow the outer race. This results in the sleeve assembly being pulled in the direction indicated by the arrow 82, against the action of the spring 63. The knock is created whenever the balls pass over such an obstruction. When the obstruction is passed pointer 48 temporarily returns to zero or substantially so, until another ball passes over the obstruction, when the deflection will again occur.

If a deflection of the pointer is noted but it is not accompanied by a knock, it means that the bearing has irregularities or high spots which prevent it from running freely, which is a common fault of reground bearings.

On the other hand, if a knock is heard, but no deflection of the pointer occurs, it means that there is a cavity in the balls or races, or both. If the knock is regular, the cavity is in one of the races. If irregular, the knock indicates the defect is in the balls.

Since the sound tube is made of good steel, one end is closed, and the open end is provided with an amplifying horn, any knocks or vibrations developed in the bearing during the test are readily detected, and since there are no other moving parts which might transmit extraneous noises or vibrations to sleeve 43, the accuracy of the test is very good. Also, the parts may be so designed that the resistance to rotation of one race with respect to the other may be measured in comparison with the resistance for a known perfect bearing.

If the bearing on test survives the first stage of the test, it is then subjected to the second stage of the test as follows:

The outer race is rotated by energizing the stator as before, and table B is grasped and gently rocked about a vertical axis in bearings 11 and 12. Referring to Fig. 7, and assuming the axis of the bearing is being swung from the full line position toward the broken line position, the outer race tends to maintain its original status with respect to the inner race by reason of the gyroscopic forces developed in it through rotation. Thus, there is a pinching action on the ball at the points indicated by the arrows 85 and 86 in Fig. 7, as there is a differential in friction between points 85 and 86. The friction at point 85 being less than at point 86 will cause the balls to turn about their vertical and horizontal axes at the same time, the two components of rotation being indicated by the arrows 87 and 88 in Fig. 7.

This phase of the test is very important because if the bearing is subjected to merely a radial load, the balls may continue to rotate about the axis 89 shown in Fig. 7 since there is no differential in grease pressure or friction to make them shift. Therefore, if the balls rotated about axis 89 throughout the test, and a defect existed in the surfaces of the balls which faced along the axis 89 so as to not actually roll on the races, such defect could not be detected in the first stage of the test.

However, by causing the outer race to tend to cant or rotate in an oblique plane with respect to the inner race, the balls are so rotated that after several rotations of the bearing, all portions of ball surfaces will have made rolling contact with all portions of the inner and outer races. If a defect shows up in the second stage of the test, it is identified in the same manner as described in connection with the first stage of the test, namely, by observing pointer 48 and the character of the sounds emitted by amplifier 61.

During the second stage of the test the table is preferably rocked back and forth in both directions (through the range permitted by stop pin 19) to make sure that the balls have placed all of their surfaces in contact with their races.

After the bearing has been brought up to speed and the second stage of the test has been performed, the current energizing the stator is cut off so that the outer race of the bearing continues to revolve by its momentum, and while the bearing is thus coasting, the same testing operations are repeated as in the second stage.

Since bearings 11 and 12 are oversized, the table is rigidly supported and yet turns with a feather touch, so that the operator may feel the gyroscopic force which alone resists turning movement of the table.

The second test stage, like the first stage previously described, does not involve the application of mechanical forces to the outer race, so no extraneous sounds or vibrations are introduced into the test.

In Fig. 8 I have shown a modified form of sound amplifying device associated with sound tube 43, comprising a microphone 91 secured to the open end of the tube in any suitable manner, and connected by leads 92 to a radio amplifier 93 of any well known construction having means for varying the degree of amplification at will. Amplifier 93 is connected to a phone or speaker 94 by leads 95. This form of the invention is operated in the same manner as the one previously described. Any sounds emitted by tube 43 are picked up by microphone 91, brought up to any desired amplification by amplifier 93 and delivered to speaker or phone 94.

Sound amplification is of great advantage for the following reasons. Suppose the bearing undergoing test is employed to rotate at 1000 R. P. M. and carry a load of 100 pounds, and one ball, or the inner or outer race has a defect such as a cavity. Any time the defective surface comes in contact with the true surface it produces a noise, termed a knock, of a certain intensity. Rotating the bearing in the testing machine, free of load, the knock is only approximately one-one-hundredth the intensity it would have in actual service and carrying a load of 100 pounds. Therefore, by amplifying the sound 100 times it will have an intensity approximately the same as it would have in actual service, and any defects can be readily detected on test.

Although I have shown an apparatus in which the inner race of the bearing is held and the outer race rotated, it is to be understood that if desired the relationship of the parts may be reversed and the inner race rotated without departing from the spirit of the invention. Also, I have shown electromagnetic means for transmitting rotative efforts to the outer race, but it is to be understood that any other means may be used so long as there is no mechanical contact between the outer bearing race, such as compressed air or steam blown against the balls at an angle or fluid turbine means or the like. It is generally preferable however to employ electromagnetic means energized by alternating electric current for rotating the outer bearing race because the successive electromagnetic impulses produced thereby in the field of the stator will enable the attendant to detect, by the consequent noise, any objectionable looseness between the balls and the races, as in a worn bearing, which would cause such a bearing to be noisy if used in an alternating current motor or generator although such a loose bearing may run quietly in a direct current motor or generator.

The invention is useful for testing all types of anti-friction bearings, it being understood that this term as used in the specification comprehends all types of bearings having rolling bodies such as balls, rollers or the like, having single or multiple rows, and the appended claims are intended to embrace the invention irrespective of what type of anti-friction bearing may be tested. Tapered roller bearings may be tested by providing appropriate attachments for mounting them in the testing apparatus.

Other changes coming within the range of equivalency of the appended claims may obviously be made in the structure without departing from the spirit of the invention, it being understood that the foregoing disclosure of the invention has been made by way of illustration and not limitation.

I claim as my invention:

1. In a bearing testing apparatus, a support, means mounting one race of an anti-friction bearing to be tested upon said support, and means for rotating the other race of said bearing, said last-named means comprising a single rotatable device rigidly connected to, and supported solely by said other race, thereby precluding the transmission of extraneous vibrations to said other race.

2. In a bearing testing apparatus, a support, means mounting the inner race of a bearing to be tested having anti-friction elements upon said support, and electromagnetic means surrounding the outer race of said bearing and operable to transmit rotative efforts thereto, whereby said outer race may rotate at high speed free from engagement with parts which would transmit vibrations thereto, except defective anti-friction elements.

3. In an anti-friction bearing testing apparatus, a support, means for securing the inner race of a bearing to be tested upon said support, means for securing an armature means to the outer race of said bearing, a stator carried by said support and having gap means cooperating in magnetic flux transmitting relationship with the said armature means, and means for energizing said stator so as to rotate said outer armature means and said race in unison.

4. In an anti-friction bearing testing apparatus, a stator structure, a magnetic flux member adapted to be secured to the outer race of a bearing to be tested, means mounting said bearing adjacent said stator structure with said flux member disposed in flux transmitting cooperation therewith, and means for energizing said stator structure.

5. The apparatus defined in claim 4, wherein said flux member is adapted to surround the outer race of said bearing and embodies means for detachably securing it thereto.

6. In an apparatus for testing anti-friction bearings, a support mounted for limited rocking movement about a fixed axis, resilient means urging said support in one direction, means for detachably securing the inner race of a bearing to be tested to said support, with its axis coincident with the axis of said support, means, comprising a single rotatable device rigidly connected to, and supported solely by the outer race of said bearing, for rotating the outer race in such a direction that imperfections in said bearing will result in rocking said support in said direction and stressing said resilient means, and means for indicating the angular deflection of said support.

7. The apparatus defined in claim 6, wherein said means for rotating the outer race of said bearing comprises an armature secured to said outer race and an electromagnetic stator structure surrounding said armature and cooperating in magnetic flux transmitting relationship therewith.

8. In an anti-friction bearing testing device, a support mounted for rotation about a fixed axis, means for securing the inner race of an anti-friction bearing to said support with its axis disposed substantially normal to a plane containing said fixed axis, and means for rotating the outer race of said bearing at high speed while permitting free rocking movement of said support about said fixed axis.

9. In an anti-friction bearing testing apparatus, a support having an elongated portion, a sleeve mounted on said portion for rocking movement, means for limiting axial movement of said sleeve on said portion, means for securing the inner race of a bearing to be tested to said sleeve, means for rotating the outer race of said bearing in one direction, and means for resiliently urging said sleeve in the opposite direction, to oppose any rotative efforts transmitted from said outer race to said inner race as the result of imperfections in said bearing.

10. The apparatus defined in claim 9, wherein said means for securing said inner race to said sleeve comprises a plurality of spacer members and means for releasably clamping said inner race between said members.

11. In an anti-friction bearing testing apparatus, a stator structure, a support disposed concentrically with respect to said stator structure, means for releasably securing the inner race of an anti-friction bearing to be tested to said support, with the outer race thereof in parallelism with the inner face of said stator structure, a paramagnetic member substantially filling the space between said outer race and said stator structure and detachably secured to said outer race for unitary rotation therewith, and means for energizing said stator structure so as to rotate said member and outer race at high speed with respect to said inner race, to cause any imperfections in the bearing to be reflected as characteristic audible sounds.

12. The apparatus defined in claim 11, together with means for rotatably supporting said stator structure and support bodily on a fixed axis disposed substantially normal to a plane containing the axis of said bearing, independently of rotation of said paramagnetic member and said outer bearing race.

13. In an anti-friction bearing testing apparatus, an upright standard, a support journalled for free rotation about a substantially vertical axis on said standard and rigidly carrying a substantially horizontally disposed elongated member, a sleeve mounted for limited rocking movement on said member and having means for securing thereto the inner race of a bearing to be tested, a stator carried by said support and disposed in magnetic flux transmitting relationship with an armature carried by the outer race of said bearing, means for energizing said stator to rotate said outer race in one direction, and resilient means urging said sleeve in the opposite direction, for yieldingly opposing any rotative efforts which may be transmitted from said outer race to said inner race as the result of imperfections in said bearing, and means for indicating the degree of rocking movement of said sleeve in response to said rotative efforts.

14. The bearing testing apparatus defined in claim 9, wherein said sleeve is supported in direct vibration-transmitting engagement with a cylindrical member constituting said support, said member being closed at one end and terminating at the other in a horn-shaped end, for amplifying sounds developed in said bearing during rotation thereof.

15. In a bearing testing apparatus, a cylindrical support having an enlarged shoulder intermediate its length, a pair of sleeves fitting over said support at either side of said shoulder and having complemental cup-shaped ends secured together and forming an annular chamber around said shoulder, a spring disposed in said chamber and having its ends connected to said shoulder and said sleeves, means for securing the inner race of an anti-friction bearing to be tested to one of said sleeves, means for rotating the outer race of said bearing, and means associated with the other of said sleeves for indicating the degree of rocking movement of said sleeves against the action of said spring in response to friction developed in said bearing as the result of imperfections.

16. Apparatus for testing anti-friction bearings, which comprises supporting means for one race of a bearing to be tested, means comprising a single rotatable device rigidly connected to, and supported solely by the other race of the bearing, for rotating said other race, means for applying a force tending to rock said one race with respect to said other race about an axis substantially normal to the axis of rotation of said bearing and thereby induce gyroscopically a skewing reaction between said races, and cause any imperfections in the bearing to be reflected as an audible indication, and audio-amplifying means for said indication mounted on said supporting means.

DEMETRIOS K. POPE.